United States Patent
Sharma et al.

(10) Patent No.: US 11,570,042 B2
(45) Date of Patent: Jan. 31, 2023

(54) SOFTWARE-DEFINED NETWORK CONTROLLER COMMUNICATION FLOW

(71) Applicant: KYNDRYL, INC., New York, NY (US)

(72) Inventors: Pawan Kumar Sharma, Dwarka (IN); Kumar Saurabh, Bangalore (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/347,690

(22) Filed: Jun. 15, 2021

(65) Prior Publication Data

US 2022/0400049 A1    Dec. 15, 2022

(51) Int. Cl.
*H04L 12/24*        (2006.01)
*H04L 41/0803*    (2022.01)
*H04L 69/324*     (2022.01)
*H04L 41/12*        (2022.01)

(52) U.S. Cl.
CPC .......... *H04L 41/0803* (2013.01); *H04L 41/12* (2013.01); *H04L 69/324* (2013.01)

(58) Field of Classification Search
CPC .... H04L 41/0803; H04L 41/12; H04L 69/324
USPC ......................................................... 709/223
See application file for complete search history.

(56) References Cited

U.S. PATENT DOCUMENTS

| 2015/0131997 | A1  | 5/2015  | Syed et al. | |
|---|---|---|---|---|
| 2016/0134527 | A1* | 5/2016  | Kwak | H04L 45/04 370/352 |
| 2016/0352653 | A1* | 12/2016 | Ranganathan | H04L 41/0806 |
| 2017/0171074 | A1* | 6/2017  | Hu | H04L 12/4641 |
| 2017/0201455 | A1* | 7/2017  | Amu | H04L 12/4625 |
| 2017/0279637 | A1  | 9/2017  | Dronadula et al. | |
| 2019/0097890 | A1* | 3/2019  | Zhang | H04L 45/64 |
| 2020/0177503 | A1* | 6/2020  | Hooda | H04L 12/66 |

(Continued)

OTHER PUBLICATIONS

Lin et al. "A West-East Bridge Based SDN Inter-Domain Testbed", Feb. 2015, IEEE. Retrieved on Jul. 12, 2022 from <https://ieeexplore.ieee.org/stamp/stamp.jsp?tp=&arnumber=7045408> (Year: 2015).*

(Continued)

*Primary Examiner* — Gil H. Lee
*Assistant Examiner* — Juan C Turriate Gastulo
(74) *Attorney, Agent, or Firm* — Erik Swanson; Andrew M. Calderon; Calderon Safran & Cole P.C.

(57) ABSTRACT

A method, system, and computer program product for open flow connection between differing software-defined network controllers are provided. The method generates a networking interface between a first networking controller and a second networking controller. Networking information is exchanged between the first networking controller and the second networking controller using the networking interface. A logical switch is generated between the first networking controller and the second networking controller by matching at least a portion of the networking information of the second networking controller at the first networking controller. The method exchanges the matched portion of the networking information from the first networking controller with the second networking controller to create layer two open flow connection between the first networking controller and the second networking controller.

17 Claims, 6 Drawing Sheets

(56) References Cited

U.S. PATENT DOCUMENTS

2020/0204485 A1 6/2020 Singh et al.
2020/0213221 A1 7/2020 Sharma et al.

OTHER PUBLICATIONS

"What Is an SDN Controller? Definition", SDxCentral Studios, Oct. 8, 2019, 7 pages. https://www.sdxcentral.com/networking/sdn/definitions/what-is-sdn-controller/.
"Multi-Vendor SDN/NFV Services: How Integrators Collaborate to Drive the Next Era of Network Automation", Interview with Bartosz Michalik & Marcin Paszkiewicz, May 2016, Systems Integration, GUAVUS, 5 pages. http://bswan.org/nfv_sdn_integration.asp.
"Technology Accelerators", ZYMR, printed Apr. 26, 2021, 8 pages. https://www.zymr.com/technology-accelerators.
Luo, "Design and Implementation of a Scalable SDN-OF Controller Cluster", Research Gate, Conference Paper, Jun. 2015, The Fifth International Conference on Advanced Communications and Computation, Insert pages. https://www.researchgate.net/publication/279527010_Design_and_Implementation_of_a_Scalable_SDN-OF_Controller_Cluster.
Meakin, "MYCOM OSI assures multi-vendor, multi-domain SDN mobile transport", mycomosi, May 2019, Press Releases, 4 pages. https://www.mycom-osi.com/news/mycom-osi-assures-multi-vendor-multi-domain-sdn-mobile-transport.
Mell et al., "The NIST Definition of Cloud Computing", Recommendations of the National Institute of Standards and Technology, Special Publication 800-145, Sep. 2011, 7 pages.
U.S. Appl. No. 14/67,914, filed Mar. 25, 2015.
U.S. Appl. No. 14/818,495, filed Aug. 5, 2015.
U.S. Appl. No. 14/931,033, filed Nov. 3, 2015.
U.S. Appl. No. 14/964,664, filed Dec. 10, 2015.
U.S. Appl. No. 14/988,860, filed Jan. 6, 2016.
U.S. Appl. No. 15/353,763, filed Nov. 17, 2016.
U.S. Appl. No. 15/405,944, filed Jan. 13, 2017.
U.S. Appl. No. 15/806,786, filed Nov. 8, 2017.
U.S. Appl. No. 15/813,949, filed Nov. 15, 2017.
U.S. Appl. No. 15/930,472, filed May 13, 2020.
U.S. Appl. No. 15/950,409, filed Apr. 11, 2018.
U.S. Appl. No. 15/992,509, filed May 30, 2018.
U.S. Appl. No. 16/041,879, filed Jul. 23, 2018.
U.S. Appl. No. 16/118,387, filed Aug. 30, 2018.
U.S. Appl. No. 16/157,622, filed Oct. 11, 2018.
U.S. Appl. No. 16/176,393, filed Oct. 31, 2018.
U.S. Appl. No. 16/177,718, filed Nov. 1, 2018.
U.S. Appl. No. 16/193,079, filed Nov. 16, 2018.
U.S. Appl. No. 16/202,352, filed Nov. 28, 2018.
U.S. Appl. No. 16/202,366, filed Nov. 28, 2018.
U.S. Appl. No. 16/245,958, filed Jan. 11, 2019.
U.S. Appl. No. 16/381,351, filed Apr. 11, 20190.
U.S. Appl. No. 16/386,316, filed Apr. 17, 2019.
U.S. Appl. No. 16/387,632, filed Apr. 18, 2019.
U.S. Appl. No. 16/394,008, filed Apr. 25, 2019.
U.S. Appl. No. 16/397,186, filed Apr. 29, 2019.
U.S. Appl. No. 16/421,156, filed May 23, 2019.
U.S. Appl. No. 16/424,952, filed May 29, 2019.
U.S. Appl. No. 16/425,102, filed May 29, 2019.
U.S. Appl. No. 16/427,429, filed May 31, 2019.
U.S. Appl. No. 16/427,679, filed May 31, 2019.
U.S. Appl. No. 16/432,258, filed Jun. 5, 2019.
U.S. Appl. No. 16/434,829, filed Jun. 7, 2019.
U.S. Appl. No. 16/434,835, filed Jun. 7, 2019.
U.S. Appl. No. 16/435,604, filed Jun. 10, 2019.
U.S. Appl. No. 16/440,644, filed Jun. 13, 2019.
U.S. Appl. No. 16/445,313, filed Jun. 19, 2019.
U.S. Appl. No. 16/453,548, filed Jun. 26, 2019.
U.S. Appl. No. 16/459,655, filed Jul. 2, 2019.
U.S. Appl. No. 16/460,855, filed Jul. 2, 2019.
U.S. Appl. No. 16/505,750, filed Jul. 9, 2019.
U.S. Appl. No. 16/508,375, filed Jul. 11, 2019.
U.S. Appl. No. 16/511,420, filed Jul. 15, 2019.
U.S. Appl. No. 16/527,084, filed Jul. 31, 2019.
U.S. Appl. No. 16/529,869, filed Aug. 2, 2019.
U.S. Appl. No. 16/537,914, filed Aug. 12, 2019.
U.S. Appl. No. 16/539,261, filed Aug. 13, 2019.
U.S. Appl. No. 16/547,645, filed Aug. 22, 2019.
U.S. Appl. No. 16/553,831, filed Aug. 28, 2019.
U.S. Appl. No. 16/568,958, filed Sep. 12, 2019.
U.S. Appl. No. 16/573,062, filed Sep. 17, 2019.
U.S. Appl. No. 16/580,356, filed Sep. 24, 2019.
U.S. Appl. No. 16/587,888, filed Sep. 30, 2019.
U.S. Appl. No. 16/593,000, filed Oct. 4, 2019.
U.S. Appl. No. 16/594,227, filed Oct. 7, 2019.
U.S. Appl. No. 16/596,021, filed Oct. 8, 2019.
U.S. Appl. No. 16/597,916, filed Oct. 10, 2019.
U.S. Appl. No. 16/598,049, filed Oct. 10, 2019.
U.S. Appl. No. 16/666,476, filed Oct. 29, 2019.
U.S. Appl. No. 16/666,483, filed Oct. 29, 2019.
U.S. Appl. No. 16/669,581, filed Oct. 31, 2019.
U.S. Appl. No. 16/685,163, filed Nov. 15, 2019.
U.S. Appl. No. 16/685,190, filed Nov. 15, 2019.
U.S. Appl. No. 16/689,122, filed Nov. 20, 2019.
U.S. Appl. No. 16/694,199, filed Nov. 25, 2019.
U.S. Appl. No. 16/694,415, filed Nov. 25, 2019.
U.S. Appl. No. 16/695,778, filed Nov. 26, 2019.
U.S. Appl. No. 16/700, 223, filed Dec. 2, 2019.
U.S. Appl. No. 16/703,429, filed Dec. 4, 2019.
U.S. Appl. No. 16/732,420, filed Jan. 2, 2020.
U.S. Appl. No. 16/735,817, filed Jan. 7, 2020.
U.S. Appl. No. 16/737,977, filed Jan. 9, 2020.
U.S. Appl. No. 16/738,403, filed Jan. 9, 2020.
U.S. Appl. No. 16/740,525, filed Jan. 13, 2020.
U.S. Appl. No. 16/740,596, filed Jan. 13, 2020.
U.S. Appl. No. 16/787,147, filed Feb. 11, 2020.
U.S. Appl. No. 16/688,549, filed Feb. 12, 2020.
U.S. Appl. No. 16/792,530, filed Feb. 17, 2020.
U.S. Appl. No. 16/811,096, filed Mar. 6, 2020.
U.S. Appl. No. 16/813,593, filed Mar. 9, 2020.
U.S. Appl. No. 16/820,929, filed Mar. 17, 2020.
U.S. Appl. No. 16/826,231, filed Mar. 21, 2020.
U.S. Appl. No. 16/829,513, filed Mar. 25, 2020.
U.S. Appl. No. 16/855,984, filed Apr. 22, 2020.
U.S. Appl. No. 16/856,429, filed Apr. 23, 2020.
U.S. Appl. No. 16/862,547, filed Apr. 29, 2020.
U.S. Appl. No. 16/863,206, filed Apr. 30, 2020.
U.S. Appl. No. 16/869,952, filed May 8, 2020.
U.S. Appl. No. 16/874,990, filed May 15, 2020.
U.S. Appl. No. 16/890,107, filed Jun. 2, 2020.
U.S. Appl. No. 16/894,300, filed Jun. 5, 2020.
U.S. Appl. No. 16/910,651, filed Jun. 24, 2020.
U.S. Appl. No. 16/920,785, filed Jul. 6, 2020.
U.S. Appl. No. 16/923,206, filed Jul. 8, 2020.
U.S. Appl. No. 16/924,804, filed Jul. 9, 2020.
U.S. Appl. No. 16/925,410, filed Jul. 10, 2020.
U.S. Appl. No. 16/925,461, filed Jul. 10, 2020.
U.S. Appl. No. 16/925,660, filed Jul. 10, 2020.
U.S. Appl. No. 16/929,554, filed Jul. 15, 2020.
U.S. Appl. No. 16/930,266, filed Jul. 15, 2020.
U.S. Appl. No. 16/930,738, filed Jul. 16, 2020.
U.S. Appl. No. 16/940,328, filed Jul. 27, 2020.
U.S. Appl. No. 16/949,796, filed Nov. 13, 2020.
U.S. Appl. No. 16/950,869, filed Nov. 17, 2020.
U.S. Appl. No. 16/952,965, filed Nov. 19, 2020.
U.S. Appl. No. 16/983,019, filed Aug. 3, 2020.
U.S. Appl. No. 16/987,455, filed Aug. 7, 2020.
U.S. Appl. No. 16/991,221, filed Aug. 12, 2020.
U.S. Appl. No. 16/991,363, filed Aug. 12, 2020.
U.S. Appl. No. 16/996,972, filed Aug. 19, 2020.
U.S. Appl. No. 16/999,099, filed Aug. 21, 2020.
U.S. Appl. No. 16/999,134, filed Aug. 21, 2020.
U.S. Appl. No. 17/000,399, filed Aug. 24, 2020.
U.S. Appl. No. 17/001,749, filed Aug. 25, 2020.

(56) References Cited

OTHER PUBLICATIONS

U.S. Appl. No. 17/001,943, filed Aug. 25, 2020.
U.S. Appl. No. 17/012,273, filed Sep. 4, 2020.
U.S. Appl. No. 17/022,651, filed Sep. 16, 2020
U.S. Appl. No. 17/029,567, filed Sep. 23, 2020.
U.S. Appl. No. 17/032,511, filed Sep. 25, 2020.
U.S. Appl. No. 17/034,102, filed Sep. 28, 2020.
U.S. Appl. No. 17/035,736, filed Sep. 29, 2020.
U.S. Appl. No. 17/035,873, filed Sep. 29, 2020.
U.S. Appl. No. 17/037,735, filed Sep. 30, 2020.
U.S. Appl. No. 17/037,922, filed Sep. 30, 2020.
U.S. Appl. No. 17/039,695 filed Sep. 30, 2020.
U.S. Appl. No. 17/064,514, filed Oct. 6, 2020.
U.S. Appl. No. 17/065,555, filed Oct. 8, 2020.
U.S. Appl. No. 17/067,878, filed Oct. 12, 2020.
U.S. Appl. No. 17/069,189, filed Oct. 13, 2020.
U.S. Appl. No. 17/082,348, filed Oct. 28, 2020.
U.S. Appl. No. 17/089,983, filed Nov. 5, 2020.
U.S. Appl. No. 17/102,695, filed Nov. 24, 2020.
U.S. Appl. No. 17/109,197, filed Dec. 2, 2020.
U.S. Appl. No. 17/115,711, filed Dec. 8, 2020.
U.S. Appl. No. 17/118,076, filed Dec. 10, 2020.
U.S. Appl. No. 17/120,571, filed Dec. 14, 2020.
U.S. Appl. No. 17/122,666, filed Dec. 15, 2020.
U.S. Appl. No. 17/123,245, filed Dec. 16, 2020.
U.S. Appl. No. 17/127,301, filed Dec. 18, 2020.
U.S. Appl. No. 17/130,147, filed Dec. 22, 2020.
U.S. Appl. No. 17/142,278, filed Jan. 6, 2021.
U.S. Appl. No. 17/144,316, filed Jan. 8, 2021.
U.S. Appl. No. 17/174,854, filed Feb. 12, 2021.
U.S. Appl. No. 17/205,045, filed Mar. 18, 2021.
U.S. Appl. No. 17/208,015, filed Mar. 22, 2021.
U.S. Appl. No. 17/208,079, filed Mar. 22, 2021.
U.S. Appl. No. 17/209,532, filed Mar. 23, 2021.
U.S. Appl. No. 17/211,948, filed Mar. 25, 2021.
U.S. Appl. No. 17/249,133, filed Feb. 22, 2021.
U.S. Appl. No. 17/303,395, filed May 27, 2021.
U.S. Appl. No. 17/303,719, filed Jun. 6, 2021.
U.S. Appl. No. 17/304,051, filed Jun. 14, 2021.
U.S. Appl. No. 17/329,248, filed May 25, 2021.
U.S. Appl. No. 17/336,551, filed Jun. 2, 2021.
U.S. Appl. No. 17/338,732, filed Jun. 4, 2021.
U.S. Appl. No.17/345,108, filed Jun. 11, 2021.
U.S. Appl. No. 17/345,220, filed Jun. 11, 2021.
U.S. Appl. No. 17/347,018, filed Jun. 14, 2021.
U.S. Appl. No. 17/347,690, filed Jun. 15, 2021.
U.S. Appl. No. 17/351,557, filed Jun. 18, 2021.
U.S. Appl. No. 17/351,770, filed Jun. 18, 2021.
U.S. Appl. No. 17/352,284, filed Jun. 19, 2021.
U.S. Appl. No. 17/352,433, filed Jun. 21, 2021.
U.S. Appl. No. 17/356,581, filed Jun. 24, 2021.
U.S. Appl. No. 17/363,754, filed Jun. 30, 2021.
U.S. Appl. No. 17/380,499, filed Jul. 20, 2021.
U.S. Appl. No. 17/393,816, filed Aug. 4, 2021.
U.S. Appl. No. 17/396,212, filed Aug. 6, 2021.
U.S. Appl. No. 17/411,146, filed Aug. 25, 2021.
U.S. Appl. No. 17/411,376, filed Aug. 25, 2021.
U.S. Appl. No. 17/445,529, filed Aug. 20, 2021.
U.S. Appl. No. 17/461,041, filed Aug. 30, 2021.
U.S. Appl. No. 17/462,129, filed Aug. 31, 2021.
U.S. Appl. No. 17/478,165, filed Sep. 17, 2021.
U.S. Appl. No. 17/484,028, filed Sep. 24, 2021.
U.S. Appl. No. 17/513,485, filed Oct. 28, 2021.

* cited by examiner

SOFTWARE-DEFINED NETWORK CONTROLLER COMMUNICATION FLOW

BACKGROUND

In software-defined networking (SDN) environments, a network's control functions are separated from forwarding functions. SDN environments often decouple the network between a control plane and a data plane. SDN environments may use SDN controllers to manage a flow control to switches, routers, applications, and business logic. SDN controllers have been developed or produced with differing protocols. The differing protocols may control or differentiate network architectures, packet routing, packet forwarding, and other network characteristics and statistics.

SUMMARY

According to an embodiment described herein, a computer-implemented method for open flow connection between differing software-defined network controllers is provided. The method generates a networking interface between a first networking controller and a second networking controller. Networking information is exchanged between the first networking controller and the second networking controller using the network interface. A logical switch is generated between the first networking controller and the second networking controller by matching at least a portion of the networking information of the second networking controller at the first networking controller. The method exchanges the matched portion of the networking information from the first networking controller with the second networking controller.

According to an embodiment described herein, a system for open flow connection between differing software-defined network controllers is provided. The system includes one or more processors and a computer-readable storage medium, coupled to the one or more processors, storing program instructions that, when executed by the one or more processors, cause the one or more processors to perform operations. The operations generate a networking interface between a first networking controller and a second networking controller. Networking information is exchanged between the first networking controller and the second networking controller using the network interface. A logical switch is generated between the first networking controller and the second networking controller by matching at least a portion of the networking information of the second networking controller at the first networking controller. The operations exchange the matched portion of the networking information from the first networking controller with the second networking controller.

According to an embodiment described herein, a computer program product for open flow connection between differing software-defined network controllers is provided. The computer program product includes a computer-readable storage medium having program instructions embodied therewith, the program instructions being executable by one or more processors to cause the one or more processors to generate a networking interface between a first networking controller and a second networking controller. Networking information is exchanged between the first networking controller and the second networking controller using the network interface. A logical switch is generated between the first networking controller and the second networking controller by matching at least a portion of the networking information of the second networking controller at the first networking controller. The computer program product exchanges the matched portion of the networking information from the first networking controller with the second networking controller.

DETAILED DESCRIPTION

Figure 1:
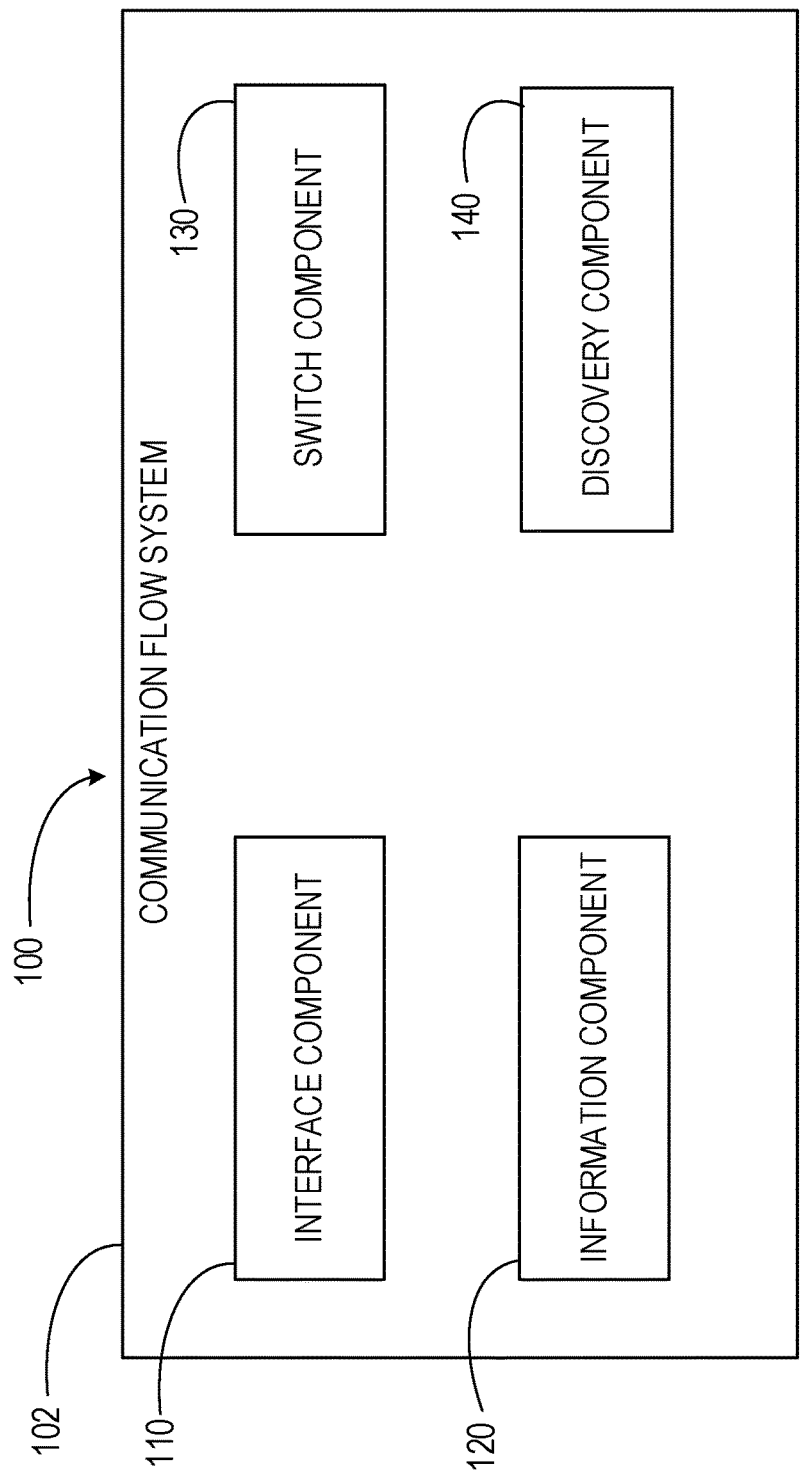
FIG. 1 depicts a block diagram of a computing environment for implementing concepts and computer-based methods, according to at least one embodiment.

The present disclosure relates generally to methods for open flow connection between differing software-defined network controllers. More particularly, but not exclusively, embodiments of the present disclosure relate to a computer-implemented method for enabling layer two open flow connections between service providers using distinct SDN controllers. The present disclosure relates further to a related system for representational computer learning, and a computer program product for operating such a system.

In SDN environments, a network's control functions are separated from forwarding functions. SDN environments often decouple the network between a control plane and a data plane. SDN environments may use SDN controllers to manage a flow control to switches, routers, applications, and business logic. In the SDN paradigm, new SDN controller vendors are developing and releasing SDN controllers. Each new SDN controller may use a known framework or a new SDN modeling framework. The SDN modeling framework may be used to decouple the network between the control plane and the data plane. However, differing SDN controllers and differing SDN modeling frameworks prevent some communication paths between SDN controllers or modeling frameworks of some SDN manufacturers or network resources associated with SDN controllers and frameworks of differing manufacturers. For larger service providers, a single network may consist of heterogeneous equipment, contributing to communication path difficulties. Instances of heterogeneous equipment may necessitate a larger service provider to a limited number of network structures or communication paths contributing to difficulties in responding to outages or service interruptions.

Embodiments of the present disclosure enables open flow connections between SDN controllers of differing types. In some instances, embodiments of the present disclosure enable layer two open flow connections between networks or service providers using distinct or different SDN controllers and SDN modeling frameworks. The present disclosure allows SDN controllers to write communication flow information on each other's domains using a respective SDN framework. The present disclosure may allow integration between multi-vendor SDN controllers across different networks or within a single network using heterogeneous equipment. Embodiments of the present disclosure enable north-south and east-west communication, including east-west communication on layer two. Embodiments of the present disclosure enable exchange of layer two data plane network information between heterogeneous SDN controllers. Service provider controllers may instruct SDN bridging platform (SBP) for suitable changes for open flow connections. In some embodiments of the present disclosure SBP matches changes with an existing state of control plane and database table. Based on the matching and changes, SBP prepares scripts, such as network configuration protocol (NETCONF) scrips for execution. Some embodiments of the present disclosure enable SDN controllers to exchange link layer discovery protocol (LLDP) and layer two topology information and to write communication path or communication flow rules on the data plane of other domains. Embodiments of the present disclosure enable design and implementation of communication flow at layer two or the data link layer between two distinct SDN domains or SDN controllers. Based on the communication flow, embodiments of the present disclosure provide low or lower latency and increased fault tolerance for SDN networks. The low latency and fault tolerance may be readily apparent in communications between differing SDN networks and SDN networks using different or heterogeneous SDN controllers.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a communication flow system 102. The communication flow system 102 may comprise an interface component 110, an information component 120, a switch component 130, and a discovery component 140. The interface component 110 generates networking interfaces between networking controllers. The information component 120 controls networking information exchanges between networking controllers. The switch component 130 generates logical switches between networking controllers. The discovery component 140 identifies networking controllers and associated controller types. Although described with distinct components, it should be understood that, in at least some embodiments, components may be combined or divided, and/or additional components may be added without departing from the scope of the present disclosure.

Figure 2:
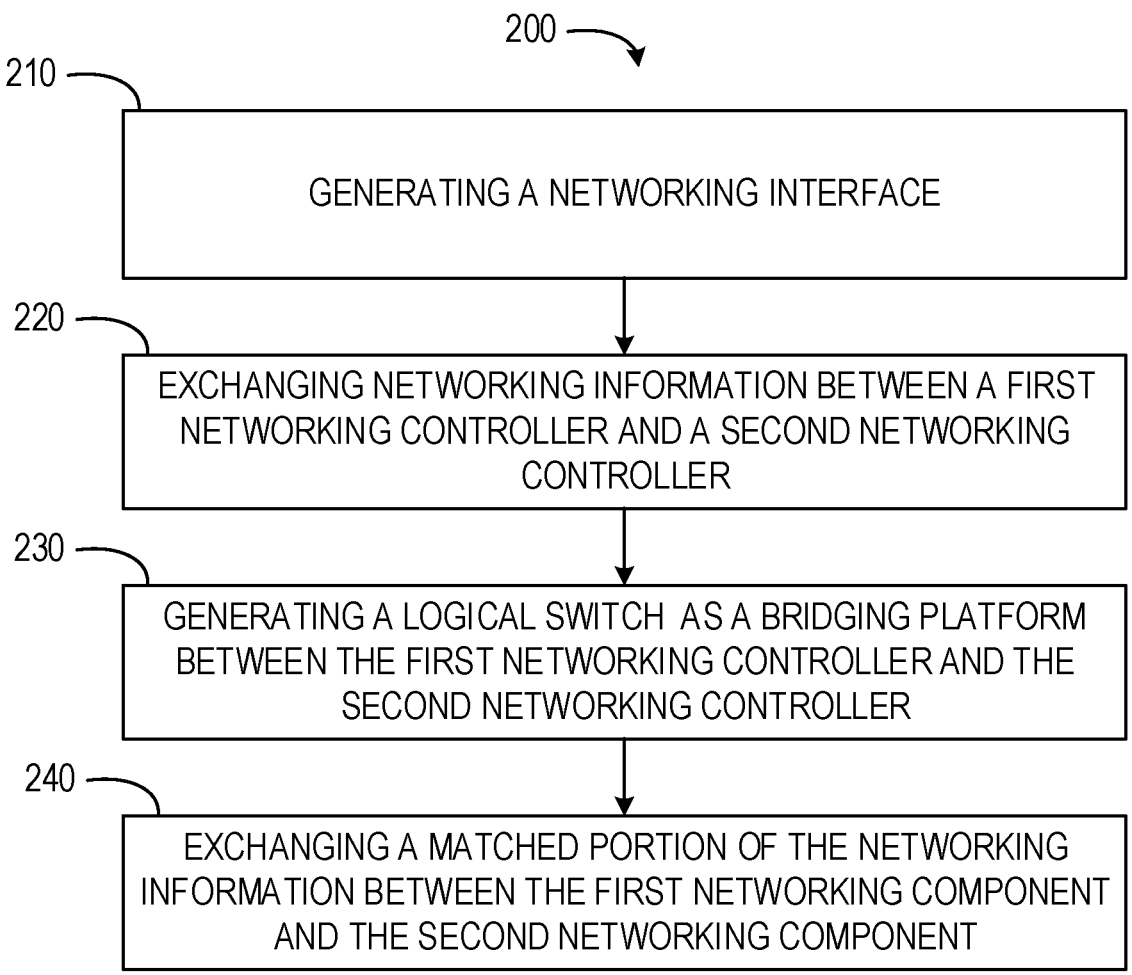
FIG. 2 depicts a flow diagram of a computer-implemented method for open flow connection between differing software-defined network controllers, according to at least one embodiment.

Referring now to FIG. 2, a flow diagram of a computer-implemented method 200 is shown. The computer-implemented method 200 is a method for open flow connection between differing software-defined network controllers. In some embodiments, the computer-implemented method 200 may be performed by one or more components of the computing environment 100, as described in more detail below.

At operation 210, the interface component 110 generates a networking interface. The networking interface may be generated between a first networking controller and a second networking controller. In some embodiments, the networking interface is a distributed control plane (DIDC) interface.

At operation 220, the information component 120 exchanges networking information between the first networking controller and the second networking controller. The information component 120 may cause the first networking controller and the second networking controller to exchange the networking information using the networking interface. In some instances, the networking information includes a link layer discovery protocol (LLDP) for each networking controller. Once LLDP networking information has been exchanged, each networking controller may build an LLDP information base regarding the other networking controller. In some embodiments, the networking information includes data link layer topology information for each networking controller. The first networking controller and the second networking controller may use the data link layer topology information and data plane information for the other respective networking controller to build or add to the LLDP information table. The information component 120 may exchange the networking information using the SBP. One or more of the first networking controller, the second networking controller, and the information component 120 may use the LLDP information table to enable write open communication flow between the SDN domains associated with the first networking controller and the second networking controller.

At operation 230, the switch component 130 generates a logical switch. The logical switch is an SDN bridging platform (SBP). The logical switch is generated between the first networking controller and the second networking controller. The logical switch or SBP may enable east-west communications between the first networking controller and the second networking controller. In some embodiments, the logical switch is generated by matching at least a portion of the networking information of the second networking controller at the first networking controller. The logical switch or SBP may act as an overlay network over two SDN controllers or SDN domains. In some instances, the logical switch or SBP acts as a platform for exchange of layer two information as per OSI layer.

In some embodiments, the logical switch is generated by matching control plane information of the networking information between the first networking controller and the second networking controller. The logical switch enables network virtualization or network slicing. In some instances, the logical switch comprises some openswitch hardware from a first service provider and some openswitch hardware from a second service provider. Information from the logical switch may be exchanged between two SDN controllers or SDN environments and a new communication flow may be created from that exchange.

At operation 240, the information component 120 exchanges the matched portion of the networking information. The matched portion of the networking information may be exchanged from the first networking controller with the second networking controller. In some embodiments, the information component 120 updates at least a portion of the network information from the first networking controller to the second networking controller to exchange the matched portion of the network information. The information component 120 may push the update from the first networking controller to the second networking controller.

In some embodiments, the information component 120, pushing the update from the first networking controller to the second networking controller, writes a communication path into a remote SDN domain (e.g., the SDN domain of the second networking controller). In some instances, the information component 120 pushes the update using application communication protocols suitable for the second networking controller, such as OpenFlow, extensible messaging and presence protocol (XMPP), NETCONF, representational state transfer configuration protocol (RESTCONF), secure shell protocol (SSH), hypertext transfer protocol secure (HTTPS), or other suitable protocols.

In some embodiments, using the SBP, the first networking controller and the second networking controller act as transmitter and receiver. Acting as both transmitter and receiver, the first networking controller and the second networking controller can push the update from each respective side of the communication flow.

Figure 3:
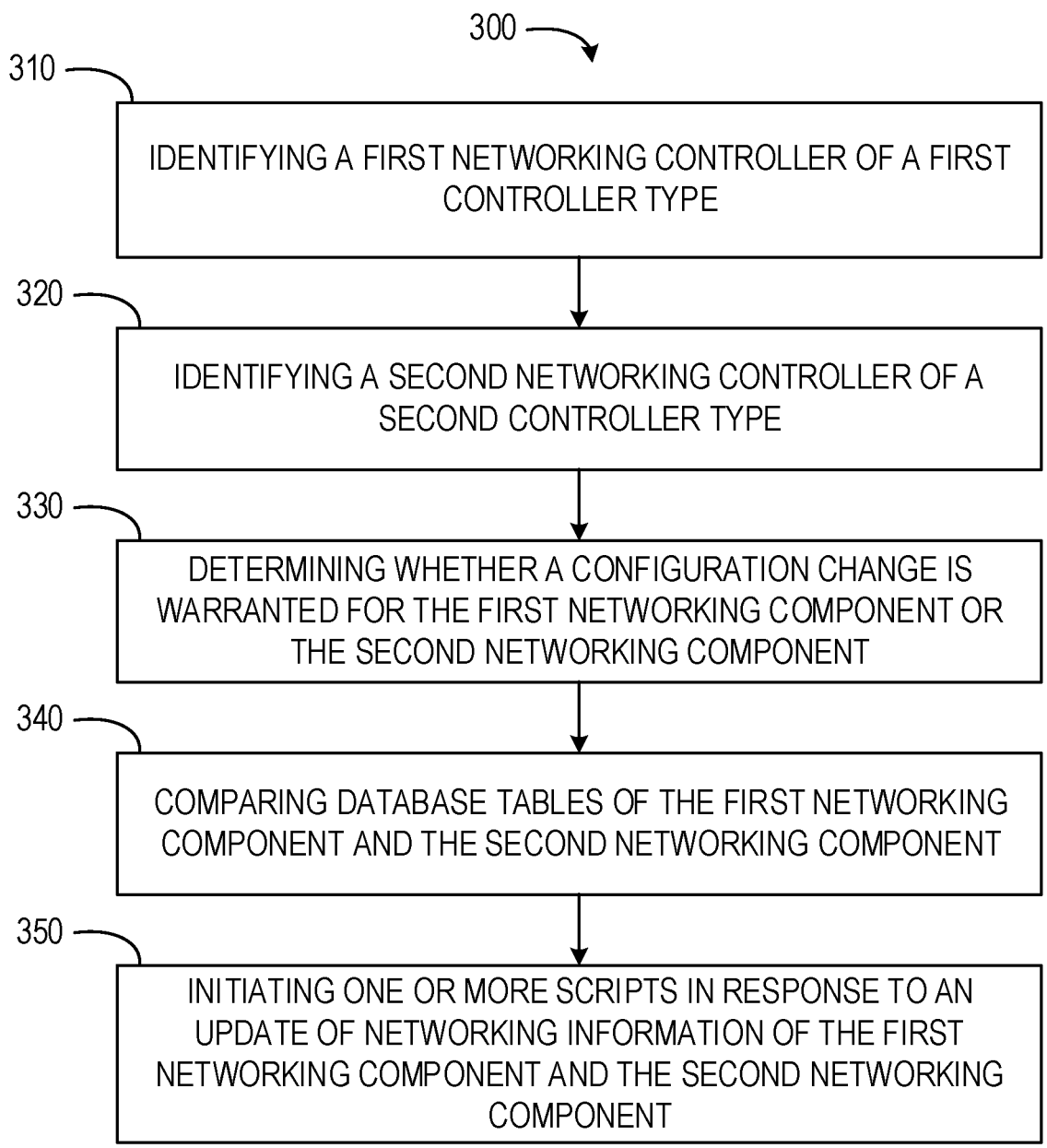
FIG. 3 depicts a flow diagram of a computer-implemented method for open flow connection between differing software-defined network controllers, according to at least one embodiment.

FIG. 3 shows a flow diagram of an embodiment of a computer-implemented method 300 for open flow connection between differing software-defined network controllers. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the discovery component 140 identifies a first networking controller. The first networking controller may be of a first controller type. In some embodiments, the first controller type is an open daylight (ODL) controller. The first networking controller may be an SDN controller having or associated with a first SDN network domain.

In operation 320, the discovery component 140 identifies a second networking controller. The second networking controller may be of a second controller type. In some embodiments, the second controller type is an open network operating system (ONOS) controller. The second networking controller may be an SDN controller having or associated with a second SDN network domain.

In operation 330, the information component 120 determines whether a configuration change is warranted for one or more of the first networking controller and the second networking controller. The information component 120 may determine that no configuration change is warranted. In some instances, no configuration change is warranted where changes already exist on the networking controller based on the SDN database table. In some embodiments, the information component 120 determines a configuration change is warranted and updates the SDN database table for the networking controller.

In operation 340, the information component 120 compares database tables of the first networking component and the second networking component. Where the database tables include previously implemented changes, mapping common properties for each database table, the information component 120 may initiate communication flow between the first networking component and the second networking component.

In embodiments where the database tables have not received suitable changes, the information component 120 determines whether to a match control plane information update is warranted. Where the match control plane information not suitable, the information component 120 may initiate communication flow between the first networking component and the second networking component. Where the match control plane information warrants an update, the information component 120 determines whether a data plane information update is warranted.

In operation 350, the information component 120 initiates one or more scripts in response to an update of the control plane information and the data plane information. In some embodiments, the one or more scrips includes RESTCONF API scripts. In such instances, the information component 120 cooperates with the switch component 130 to establish a connection between the first networking controller and the second networking controller. The established connection may be an SSH connection. In some embodiments, the information component 120 and the switch component 130 executes changes to one or more of the first networking component and the second networking component to implement communication flow or updates between the first networking component and the second networking component.

Figure 4:
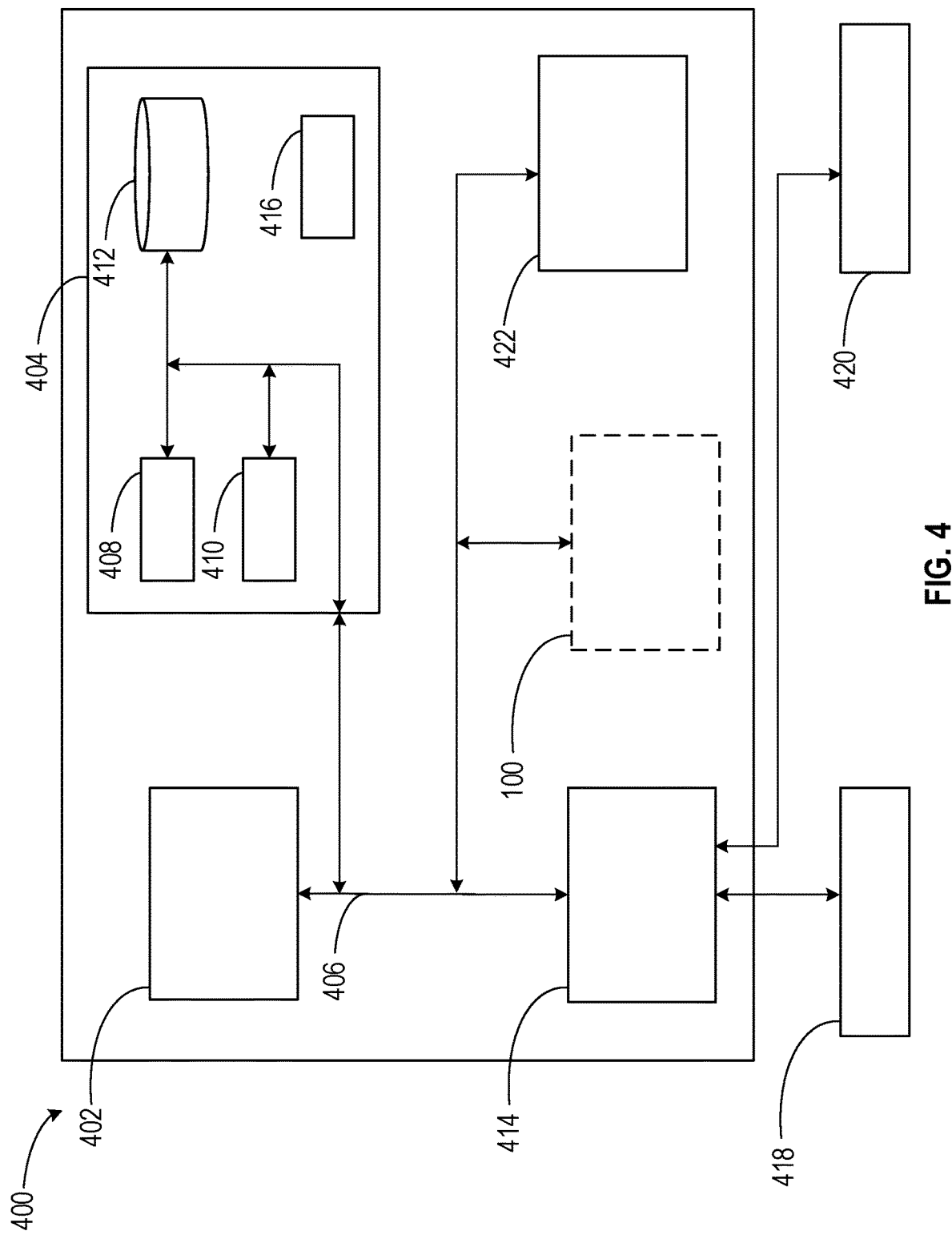
FIG. 4 depicts a block diagram of a computing system for open flow connection between differing software-defined network controllers, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for representational learning of product formulas.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the interface component 110, the information component 120, the switch component 130, and the discovery component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
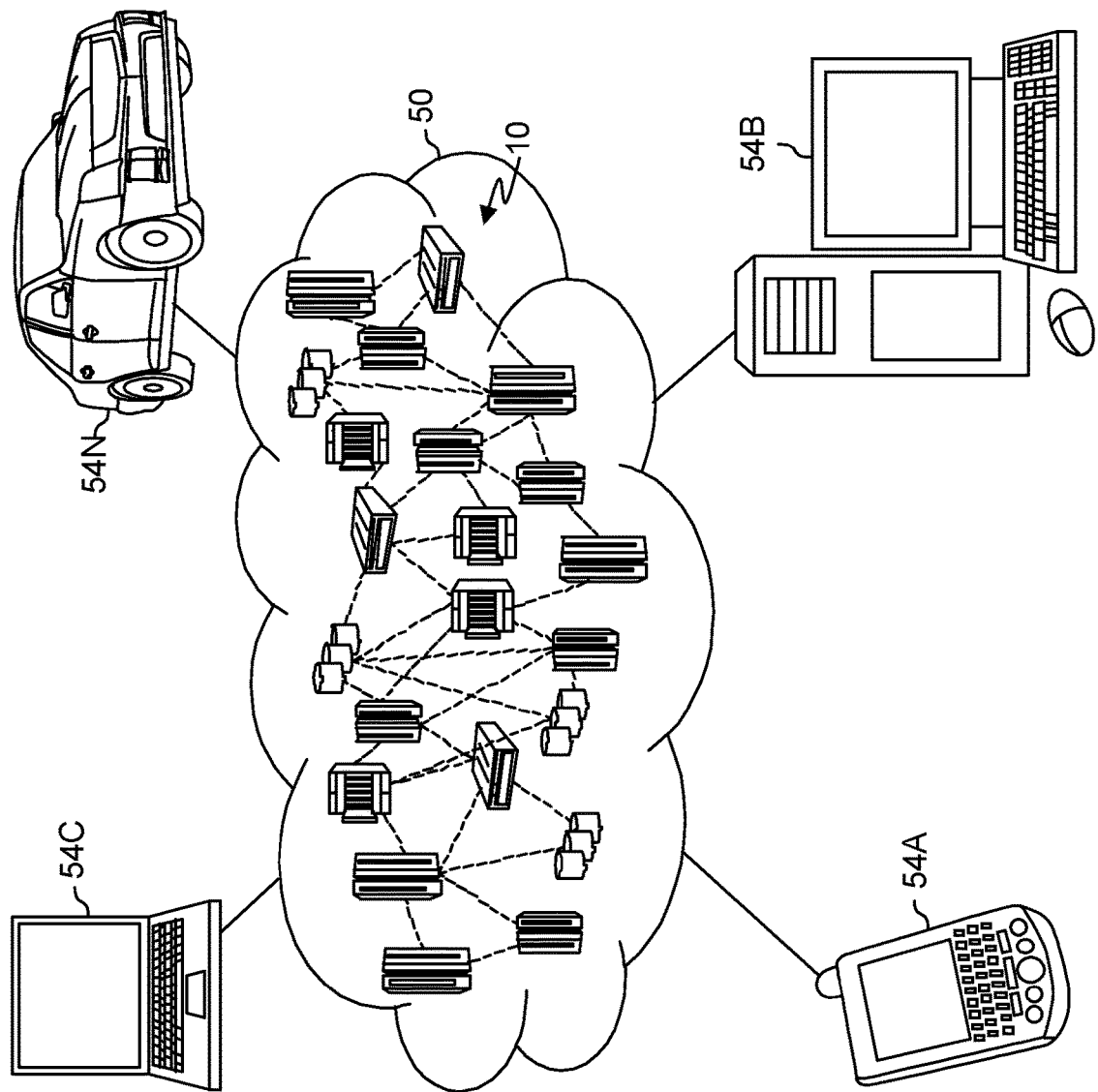
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
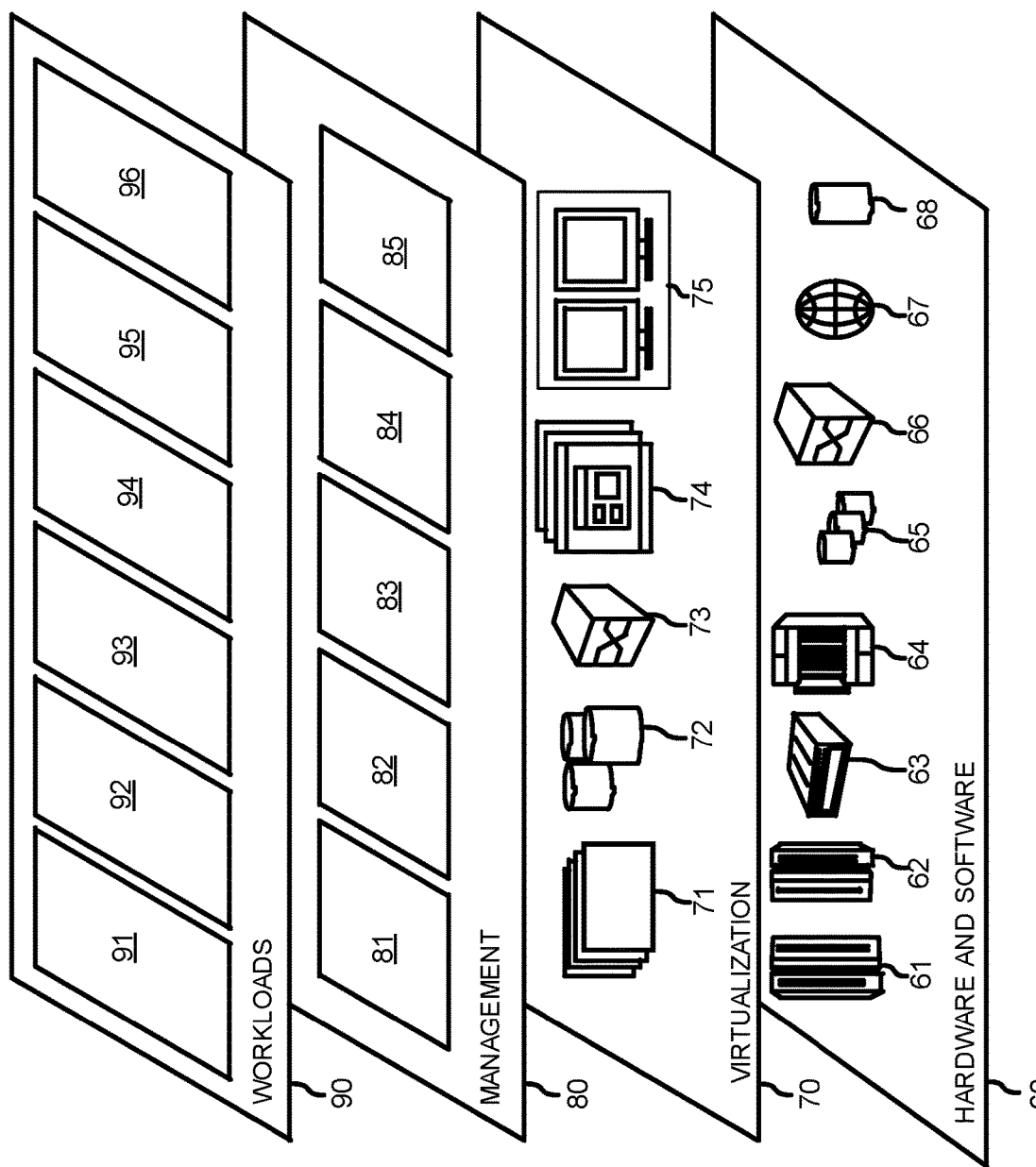
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and open flow communication processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating a networking interface between a first software-defined network (SDN) controller and a second SDN controller, wherein the networking interface is a distributed control plane interface;
exchanging networking information between the first SDN controller and the second SDN controller using the networking interface, the networking information including data link layer topology information for each SDN controller;
generating a logical switch as a bridging platform that enables east-west communications between the first SDN controller and the second SDN controller by matching at least a portion of the networking information of the second SDN controller at the first SDN controller; and
exchanging the matched portion of the networking information from the first SDN controller with the second SDN controller.

2. The method of claim 1, further comprising:
identifying the first SDN controller of a first controller type; and
identifying the second SDN controller of a second controller type distinct from the first controller type.

3. The method of claim 2, wherein the first controller type is an Open Daylight (ODL) controller and the second controller type is an Open Network Operating System (ONOS) controller.

4. The method of claim 1, wherein the networking information includes a link layer discovery protocol (LLDP) for each SDN controller.

5. The method of claim 1, wherein the logical switch is generated between the first SDN controller and the second SDN controller by matching control plane information of the networking information between the first SDN controller and the second SDN controller.

6. The method of claim 1, wherein exchanging the matched portion of the network information updates at least a portion of the networking information to the second SDN controller from the first SDN controller.

7. A system, comprising:
one or more processors; and
a computer-readable storage medium, coupled to the one or more processors, storing program instructions that, when executed by the one or more processors, cause the one or more processors to perform operations comprising:
generating a networking interface between a first SDN controller and a second SDN controller, wherein the networking interface is a distributed control plane interface;
exchanging networking information between the first SDN controller and the second SDN controller using the networking interface, the network information including data link layer topology information for each SDN controller;
generating a logical switch as a bridging platform that enables east-west communications between the first SDN controller and the second SDN controller by matching at least a portion of the networking information of the second SDN controller at the first SDN controller; and
exchanging the matched portion of the networking information from the first SDN controller with the second SDN controller.

8. The system of claim 7, wherein the operations further comprise:
identifying the first SDN controller of a first controller type; and
identifying the second SDN controller of a second controller type distinct from the first controller type.

9. The system of claim 8, wherein the first controller type is an Open Daylight (ODL) controller and the second controller type is an Open Network Operating System (ONOS) controller.

10. The system of claim 7, wherein the networking information includes a link layer discovery protocol (LLDP) for each SDN controller.

11. The system of claim 7, wherein the logical switch is generated between the first SDN controller and the second SDN controller by matching control plane information of the networking information between the first SDN controller and the second SDN controller.

12. The system of claim 7, wherein exchanging the matched portion of the network information updates at least a portion of the networking information to the second SDN controller from the first SDN controller.

13. A computer program product comprising a computer readable storage medium having program instructions embodied therewith, the program instructions being executable by one or more processors to cause the one or more processors to perform operations comprising:
generating a networking interface between a first SDN controller and a second SDN controller, wherein the networking interface is a distributed control plane interface;
exchanging networking information between the first SDN controller and the second SDN controller using the networking interface, the networking information including data link layer topology information for each SDN controller;

generating a logical switch as a bridging platform that enables east-west communications between the first SDN controller and the second SDN controller by matching at least a portion of the networking information of the second SDN controller at the first SDN controller; and exchanging the matched portion of the networking information from the first SDN controller with the second SDN controller.

14. The computer program product of claim 13, wherein the operations further include:

identifying the first SDN controller of a first controller type, the first controller type being an Open Daylight (ODL) controller; and identifying the second SDN controller of a second controller type, the second controller type being an Open Network Operating System (ONOS) controller.

15. The computer program product of claim 13, wherein the networking information includes a link layer discovery protocol (LLDP) for each SDN controller.

16. The computer program product of claim 13, wherein the logical switch is generated between the first SDN controller and the second SDN controller by matching control plane information of the networking information between the first SDN controller and the second SDN controller.

17. The computer program product of claim 13, wherein exchanging the matched portion of the network information updates at least a portion of the networking information to the second SDN controller from the first SDN controller.

* * * * *